Sept. 13, 1938.  F. M. CLARK ET AL  2,130,264
PLASTIC COMPOSITION OF RUBBER AND CHLORINATED DIPHENYL
Filed Oct. 19, 1937
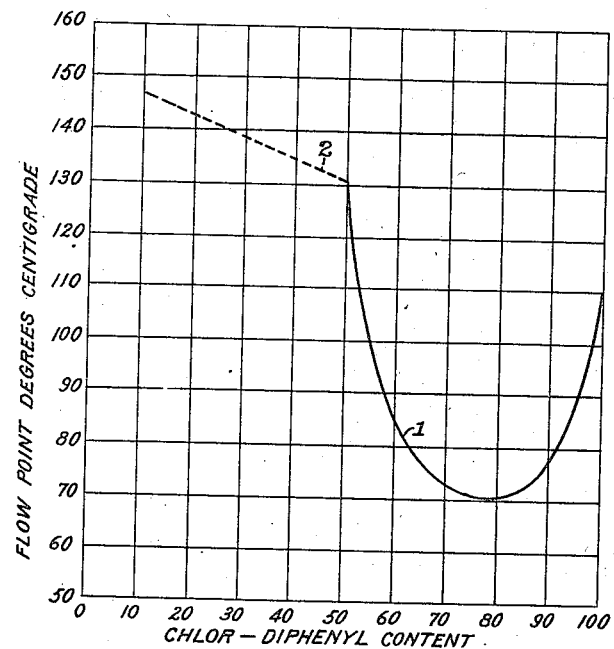
Inventors:
Frank M. Clark,
John H. Koenig,
by Harry E. Dunlap
Their Attorney.

Patented Sept. 13, 1938

2,130,264

UNITED STATES PATENT OFFICE 2,130,264

PLASTIC COMPOSITION OF RUBBER AND CHLORINATED DIPHENYL

Frank M. Clark, Pittsfield, Mass., and John H. Koenig, Columbus, Ohio, assignors to General Electric Company, a corporation of New York Application October 19, 1937, Serial No. 169,796

4 Claims. (Cl. 106—13)

This application is a continuation-in-part of our prior application, Serial No. 737,951, filed August 1, 1934.

The present invention comprises a new composition suitable for use for various purposes and, in particular, for electrical insulation. The compositions embodying our invention are made up of rubber and solid halogenated polyphenyl, preferably solid, resinous chlorinated diphenyl.

One of the objects of our invention is to provide compositions which are non-inflammable, non-oxidizing, fusible, and flowable, free from crystallinity, possessing the ability to adhere firmly to metals and insulations normally used in electrical apparatus, and being more adhesive and of softer consistency than either rubber or resinous chlorinated diphenyl.

The accompanying drawing is a graph showing flow point-temperature relations of compositions embodying our invention.

In preparing compositions embodying our invention, rubber may be blended with solid chlorinated diphenyl containing by weight at least about 60 per cent of combined chlorine. We prefer to use chlorinated diphenyl containing about 65 per cent of chlorine. It is a solid resin having a flow point of about 110° C.

Rubber, when subjected to the ordinary flow point test of A. S. T. M. standards, (D36—26), does not exhibit flow without permanent change. It softens at a temperature indefinitely above 165° C. but when once softened does not return to its original state, in contrast to the compounds described in this application.

Although the two essential ingredients of our composition may be used in various proportions, in accordance with the properties desired in the product, we prefer for most purposes to employ the polyphenyl compound in a proportion equal to, or preponderating over, the proportion of rubber by weight. Compositions, made by blending 50 to 95 parts of chlorinated polyphenyl (containing 60 to 65 per cent combined chlorine) with 50 to 5 parts by weight of rubber, as shown by branch 1 of the graph, have a flow point which is lower than that of the chlorinated diphenyl constituent, and lower than the softening point of rubber. These compositions, furthermore, are non-crystalline and are characterized by a softness of consistency and tackiness (or adhesiveness) not possessed by either constituent. All of the compositions embodying our invention are homogenous and manifest the properties of solutions.

The drawing shows the relation of flow point to composition, the flow points being plotted as ordinates, and the percentages of resin as abscissae.

A composition containing 95 per cent chlorinated diphenyl (60 per cent chlorine) and about 5 per cent rubber is somewhat tacky and has a flow point of about 88° C. Compositions containing about 15 to 25 per cent rubber and 85 to 75 per cent of the same chlorinated diphenyl have flow points of about 72° C. The range of 70 to 90 per cent resin content is preferred for most purposes. The flow point increases as the proportion of rubber is increased, a flow point of 132° C. characterizing a rubber content of about 50 per cent. With further increase in rubber content, a discontinuity occurs, as indicated by the dotted line 2 in the graph. The flow point of compositions containing more than 50 per cent rubber lie on a straight line, which has been continued only to a rubber content of approximately 90 per cent. As rubber has no true flow point, the branch 2 could not be continued for compositions consisting wholly or nearly wholly of rubber.

In like manner the penetration values show abnormality. Compositions containing at least about 50 per cent by weight of solid chlorinated diphenyl (of about 60 to 65 per cent chlorine content) are soft and tacky, are flowable and may be cast, are non-crystalline, have some elasticity, are moldable, relatively tough, and readily admixed with fillers, fibrous materials, and the like. The A. S. T. M. standard penetration test shows a penetration of about 123 mm. A composition containing about 25 per cent of rubber and 75 per cent of resin showed a penetration of about 228 mm. A composition containing about 15 per cent of rubber and 85 per cent of the resin showed a penetration of about 173 mm. The resin showed zero penetration.

In the preparation of compositions embodying our invention the rubber is homogeneously blended with the polyphenyl compound in any suitable manner, preferably by the solution of both ingredients in a solvent. Each constituent is dissolved separately in a suitable solvent liquid, for example, carbon tetrachloride, or benzene. The solutions are mixed and the solvent is evaporated.

In some cases the solid polyphenyl compounds may contain modifying radicals and still be useful for the purposes of our invention. For example, the phenyl radicals may be linked together through carbon radicals such as methyl, ethyl, carbonyl, or the like. Such compounds are described in U. S. Letters Patents 2,033,612, 2,012,301 and 2,012,302, which are assigned to the same assignee as the present application. In the same manner, solid halogenated diphenyl oxide may be used in place of solid halogenated diphenyl for compounding with rubber.

Compositions made in accordance with our invention can be fused and can be poured in the liquid state into molds. They are much more resistant to oxidation than ordinary rubber compositions and, in particular, are resistant to ozone. The latter property is of especial value in electrical apparatus in which the sensitivity of ordinary rubber to ozone generated by electric discharges has been a serious problem.

The gases produced by the thermal or electrical compositions of compounds embodying our invention are non-inflammable when the percentage of halogen in the compound is sufficiently high. Thermal decomposition of rubber results in the production of hydrogen and other inflammable gas. Halogenated compounds, such as chlorinated diphenyl, supply chlorine or other halogen which combines with the hydrogen evolved from the rubber to form a non-inflammable gas. Hence, if a sufficiently highly chlorinated polyphenyl compound is employed and especially if such compound is present in preponderating proportions, then the gases given off upon decomposition of the blended product are non-inflammable.

While the compositions embodying our invention are not limited to any particular field of application, they are of especial utility in the field of electrical insulation. These compositions may be used in conjunction with other insulating materials, as for example asbestos, cotton, linen or paper. The compositions embodying our invention may be applied upon fibrous sheet material, such as cloth or paper, or introduced into the fibers thereof by impregnation. They may be applied in the liquid state or while in solution. Asbestos may be mixed therewith in various known ways, for example, when the composition is fused or in solution, or the asbestos may be mechanically admixed with the product during the milling and mixing operation incident to its preparation. In some cases it is desired to add to the composition a vulcanizing agent, or modifying material. It is possible to add to the composition fillers, pigments, resins, gums, or other addition agents as now understood in the art of compounding rubber.

The compositions embodying our invention are of especial utility for use as filling compounds in potheads and cable joints. The adhesiveness or stickiness of these new compositions, especially to metals, (a property not possessed by either ingredient) is of importance in potheads and cables where it is important that the insulation should not crack away from the conductor which it protects and insulates, as otherwise voids or spaces would be formed, the gas in which would be easily ionizable and cause electric breakdown. The high viscosity of the new compositions above their flow points also is advantageous. When liquefied, they will be retained by impregnated devices. Asphalt, petrolatum and pitches, by contrast, crack away at low temperatures and have in comparison much lower viscosities than the present new composition at temperatures above their flow points.

Although in the manufacture of the compositions of our invention the chlorine compounds of diphenyl, or the like, are of particular interest, other halogens, such as bromine and iodine, may on suitable occasion be substituted for the chlorine, wholly or in part.

What we claim as new and desire to secure by Letters Patent of the United States is:

1. Fusible, plastic, homogeneous and tacky electrical insulation consisting of rubber and chlorinated diphenyl, the latter being present in an amount materially greater than 50 per cent and materially less than 100 per cent by weight, the chlorinated diphenyl containing at least about 60 per cent chlorine.

2. Homogeneous electrical insulation which is plastic, adhesive, and fusible, consisting essentially of about 70 to 90 parts by weight of chlorinated diphenyl containing at least 65 per cent chlorine and about 30 to 10 parts by weight of rubber.

3. Homogeneous electrical insulation consisting by weight of about 75 to 85 parts of chlorinated diphenyl (60 to 65 per cent chlorine) and 25 to 15 parts of rubber, said compositions being characterized by tackiness, non-inflammability, resistance to ozone, non-crystallinity, fusibility with a flow point of about 72° C., and penetration test values within a range of about 173 to 228 mm.

4. Homogeneous fillings for electric pothead and cable joints consisting essentially of rubber and solid chlorinated diphenyl, the latter being of at least about 60 per cent chlorine content, said compositions being characterized by fusibility, non-inflammability, adhesiveness and freedom from crystallinity, and a soft consistency which by the A. S. T. M. standard test is characterized by penetration values within the range of about 123 to 228 mm.

FRANK M. CLARK.
JOHN H. KOENIG.